United States Patent
Villeius et al.

(10) Patent No.: US 11,912,368 B2
(45) Date of Patent: Feb. 27, 2024

(54) SCOOTER WITH SAFETY DEVICE COMPRISING AN INFLATABLE CUSHION

(71) Applicant: Autoliv Development AB, Vargarda (SE)

(72) Inventors: Elin Villeius, Alingsås (SE); Emma Lindholm, Vårgårda (SE); Hassan Jan, Alingsås (SE); Louise Melin, Gothenburg (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 199 days.

(21) Appl. No.: 17/160,811

(22) Filed: Jan. 28, 2021

(65) Prior Publication Data
US 2021/0237821 A1    Aug. 5, 2021

(30) Foreign Application Priority Data

Jan. 31, 2020    (FR) ...................................... 2000984

(51) Int. Cl.
*B62J 27/20*    (2020.01)

(52) U.S. Cl.
CPC ..................... *B62J 27/20* (2020.02)

(58) Field of Classification Search
CPC ... B60Y 2200/126; B62J 27/20; B62J 45/412; B62K 3/002; B60R 21/203; B60R 21/237; B60R 21/264; B60R 2021/01211
See application file for complete search history.

(56) References Cited

U.S. PATENT DOCUMENTS

| | | | |
|---|---|---|---|
| 6,531,838 B2 | 3/2003 | Parks | |
| 7,404,570 B2 | 7/2008 | Miyata | |
| 7,934,744 B2 | 5/2011 | Suzuki et al. | |
| 9,956,933 B2 | 5/2018 | Wahl et al. | |
| 2002/0079855 A1 | 6/2002 | Parks | |
| 2003/0042058 A1 | 3/2003 | Chen | |
| 2003/0102177 A1* | 6/2003 | Igawa | B60R 21/36 180/271 |
| 2003/0214122 A1 | 11/2003 | Miyata | |

(Continued)

FOREIGN PATENT DOCUMENTS

| CN | 105015669 A | 11/2015 |
|---|---|---|
| CN | 209719794 A | 12/2019 |

(Continued)

OTHER PUBLICATIONS

Mahdi, Protection Device for Protecting a Rider of a Two-Wheeler, Mar. 31, 2016, EPO, WO 2016046416 A1, Machine Translation of Description (Year: 2016).*

(Continued)

*Primary Examiner* — Paul N Dickson
*Assistant Examiner* — Matthew D Lee
(74) *Attorney, Agent, or Firm* — DICKINSON WRIGHT PLLC

(57) ABSTRACT

A scooter, for example an electric scooter, having two wheels, an elongated platform mounted on the two wheels and arranged to receive at least one foot of a user, a steering handlebar articulated relative to the platform and connected to one of the wheels, wherein the scooter comprises a safety device with an inflatable cushion arranged to be deployed in case of sudden deceleration of the scooter.

11 Claims, 5 Drawing Sheets

(56) References Cited

U.S. PATENT DOCUMENTS

| | | | |
|---|---|---|---|
| 2004/0017066 A1* | 1/2004 | Kuroe | B62J 27/20 280/730.1 |
| 2004/0075256 A1* | 4/2004 | Klaiber | B60R 21/237 280/730.2 |
| 2009/0167002 A1 | 7/2009 | Suzuki et al. | |
| 2016/0207486 A1 | 7/2016 | Wahl et al. | |
| 2017/0232921 A1* | 8/2017 | Richard | B62J 27/20 280/730.1 |
| 2021/0171145 A1* | 6/2021 | Kuroki | B60R 21/20 |

FOREIGN PATENT DOCUMENTS

| | | | | |
|---|---|---|---|---|
| DE | 102018107492 A1 | | 10/2019 | |
| EP | 2075182 A1 | | 7/2009 | |
| EP | 2762395 A1 | | 8/2014 | |
| GB | 2508709 A | | 6/2014 | |
| JP | 2001233267 A | | 8/2001 | |
| JP | 2004136790 A | * | 5/2004 | B62J 27/00 |
| JP | 2007269048 A | * | 10/2007 | |
| TW | 201916826 A | | 5/2019 | |
| WO | 2015032736 A1 | | 3/2015 | |
| WO | WO-2016046416 A1 | * | 3/2016 | B60R 21/235 |
| WO | WO-2019207775 A1 | * | 10/2019 | B60R 21/16 |

OTHER PUBLICATIONS

Mahdi, Airbag Apparatus, Oct. 18, 2007, EPO, JP 2007269048 A, Machine Translation of Description (Year: 2007).*

Ikawa, Air Bag Device, Motorcycle With the Device, and Method for Manufacturing the Device, May 13, 2004, EPO, JP 2004136790 A, Machine Translation of Description (Year: 2004).*

* cited by examiner

[Fig. 1]
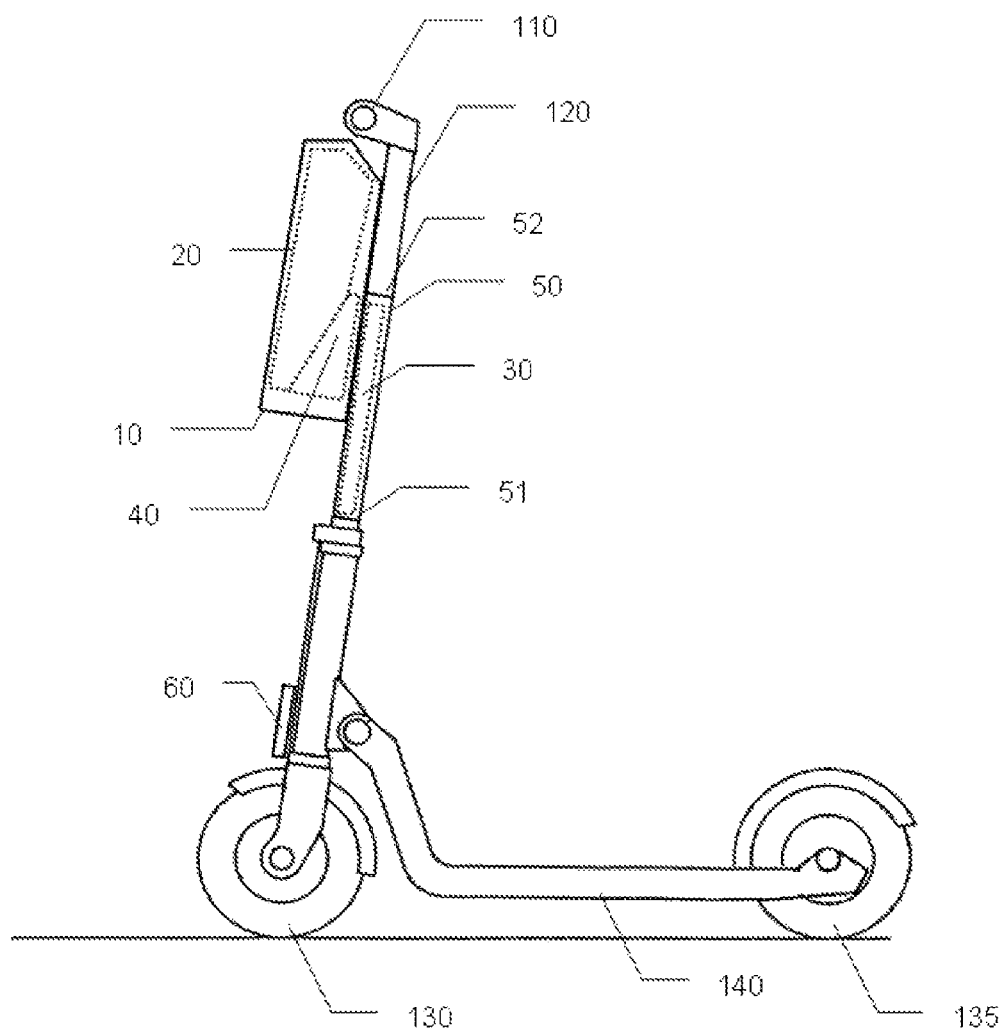

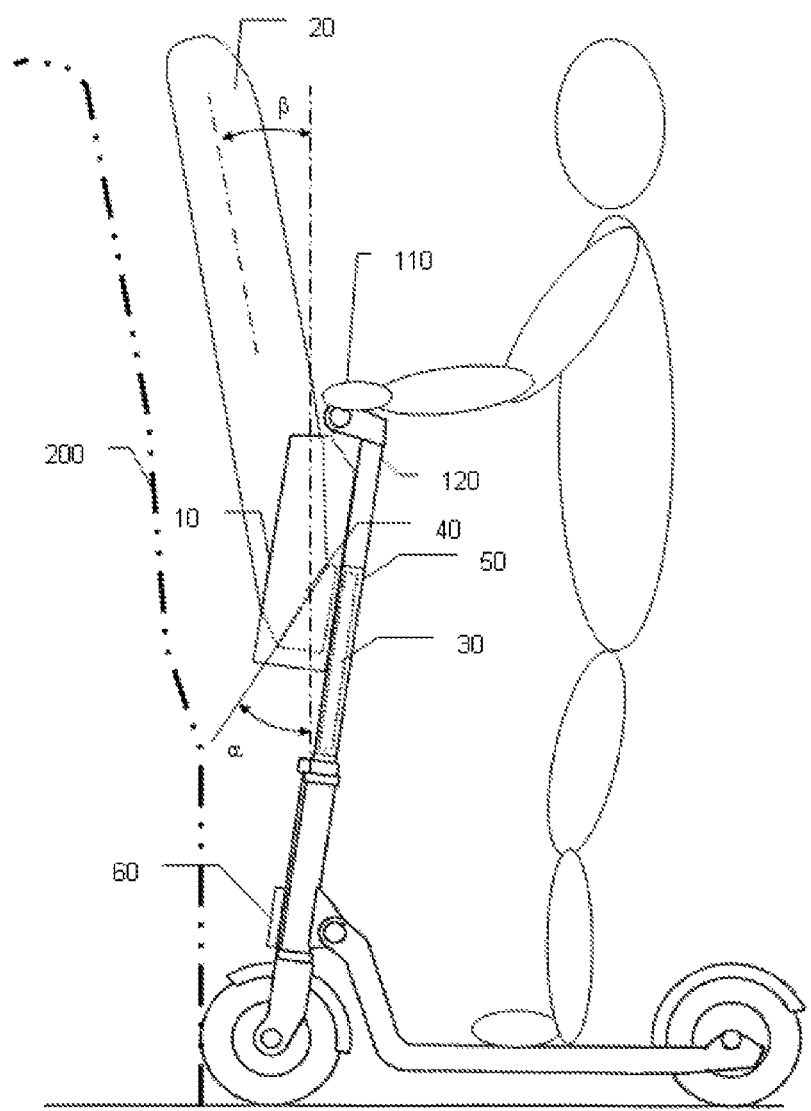
[Fig. 2]

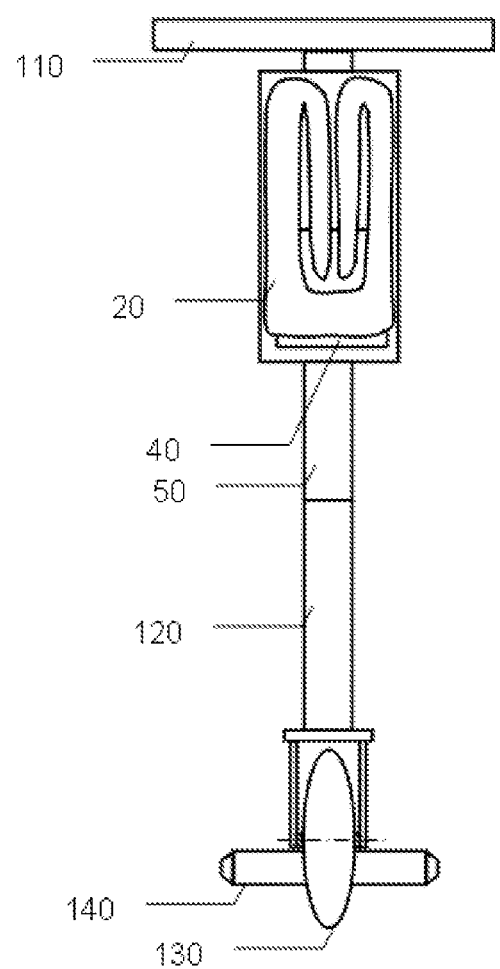
[Fig. 3]

[Fig. 4]
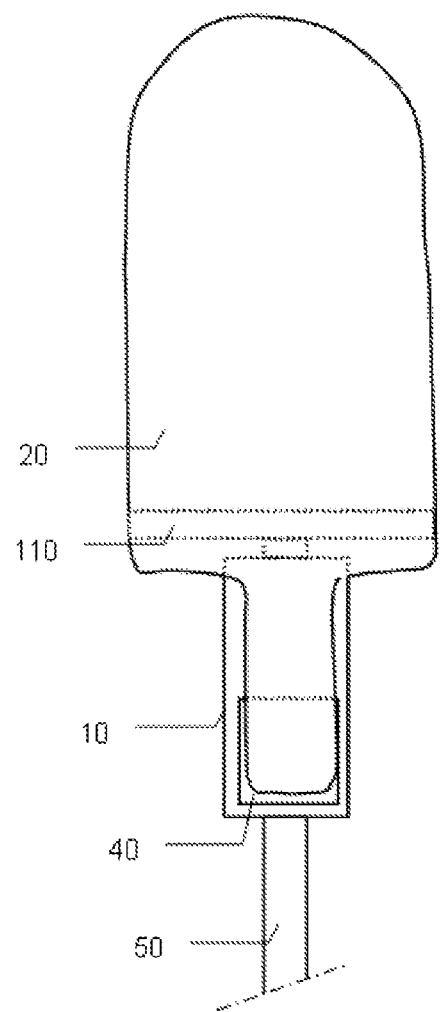

[Fig. 5]
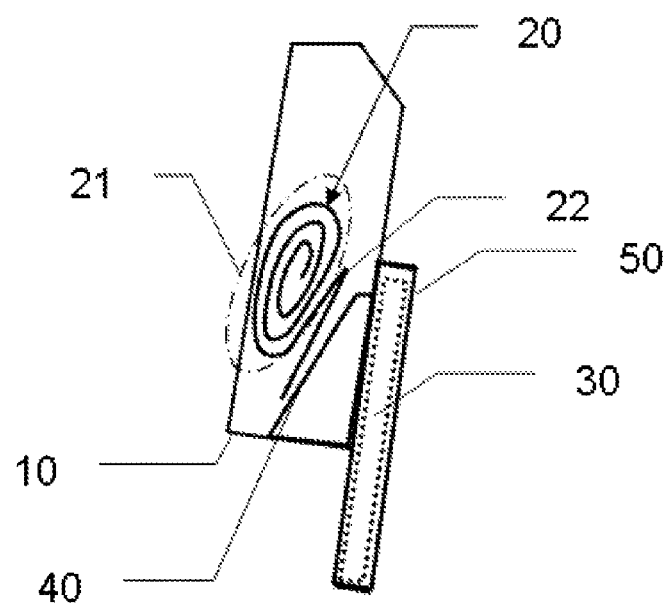

SCOOTER WITH SAFETY DEVICE COMPRISING AN INFLATABLE CUSHION

CROSS-REFERENCE TO RELATED APPLICATIONS

This application claims priority pursuant to 35 U.S.C. 119(a) of French Patent Application No. 2000984, filed Jan. 31, 2020, which application is incorporated herein by reference in its entirety.

TECHNICAL FIELD OF THE INVENTION

The present invention relates generally to a scooter and in particular an electric scooter.

PRIOR ART

It is known to propose electric scooters, otherwise referred to as kick scooters, stand up scooters or just scooters, which comprise an elongated platform mounted on two wheels, and a steering handlebar, an electric motor and a battery. A user may stand on the elongated platform and actuate a control device to drive the electric motor in order to speed up.

These scooters (whether electric or not) are very popular and offer a practical and versatile means of travel, but on the other hand, this means of travel may have risks of falling or colliding with obstacles (other vehicles, in particular cars). The user may then be injured, sometimes seriously. Injuries become more serious with increased speed, in particular with electric scooters.

DESCRIPTION OF THE INVENTION

One aim of the present invention is to respond to the above-mentioned disadvantages of the scooters of the prior art, and in particular, first and foremost, to propose a scooter which can be used safely, in particular in the event of falling or impact with an obstacle.

To that end, a first aspect of the invention relates to a scooter, for example an electric scooter, comprising:
two wheels,
an elongated platform mounted on the two wheels and arranged to receive at least one foot of a user,
a steering handlebar articulated relative to the platform and connected to one of the wheels,
wherein the scooter comprises a safety device with an inflatable cushion arranged to be deployed in case of sudden deceleration of the scooter.

The inflatable cushion of the above implementation may be deployed in case of an impact (sudden deceleration) to protect the user of the scooter or even another person (a pedestrian), affording the ability to absorb shocks and/or dissipate energy. The impact applied to the user or the other person is thus less brutal.

Typically, the inflatable cushion may be arranged to be deployed at high speed, to insert itself between the obstacle and the user. It is possible to conceive of deploying the inflatable cushion in less than 100 ms, preferably in less than 50 ms, and even more preferentially in less than 25 ms. This means that the inflatable cushion occupies at least 90% of the final deployed surface area in less than the times mentioned.

Typically, the scooter does not have a seat.

Typically, the platform has a width of less than 30 cm, 25 cm or even 20 cm; the width being measured transversely to the distance between the two wheels.

According to one embodiment, the safety device, before deployment, can form a safety module comprising a housing containing the inflatable cushion and arranged on the handlebar, or between the handlebar and:
one of the wheels, preferably a front wheel, and/or
the platform.

In other words, the safety device can be a module attached at the front part of the scooter, in particular on or under the handlebar, for example in the top part of the steering column. The handlebar is typically formed of a transverse bar attached at the top of the steering column, optionally by a bracket.

According to one embodiment, the inflatable cushion may be arranged to be deployed at least on a side of the handlebar opposite to the platform and/or to the wheels. In other words, the inflatable cushion is arranged to be deployed upwardly, that is to be inserted between an obstacle and the torso and/or the head and/or the arms and/or the hands of the user.

According to one embodiment, the inflatable cushion deployed may be at least half arranged, preferentially at least 60%, more preferentially at least 75%, on the side of the handlebar opposite to the platform and/or to the wheels.

According to one embodiment, the scooter may comprise an electronic control unit, arranged to control the deployment of the inflatable cushion.

According to one embodiment, the electronic control unit may comprise an embedded acceleration measuring unit, such as an accelerometer, attached to the frame of the scooter, for example at a front wheel or a front mudguard, or at a housing of the safety device containing the inflatable cushion. When the acceleration measuring unit is attached to the housing, this facilitates the assembly of the safety device on the scooter.

It is also possible to conceive of using gyroscopes in addition to, or instead of, accelerometers.

According to one embodiment, the scooter may comprise a battery for motorizing the scooter.

According to one embodiment, the battery may be arranged to power the electronic control unit. This avoids having to provide a separate power supply.

According to one embodiment, before deployment, the inflatable cushion may be folded in on itself so as to be deployed from or toward the side of the handlebar which is opposite to the platform and/or to the wheels.

According to one embodiment, the folding of the inflatable cushion may comprise rolling of the inflatable cushion in on itself in a clockwise direction, when the roll is viewed from the left, with the handlebar oriented toward the front. Such an implementation enables the inflatable cushion to "unroll onto the obstacle" during deployment. Indeed, the applicant observed that unrolling in the other direction could cause blockages during deployment.

In other words, before deployment, the inflatable cushion may be folded in on itself so as to be deployed from or toward the side of the handlebar which is opposite to the platform and/or to the wheels, and the inflatable cushion may be shaped or configured with rolling of the inflatable cushion in on itself in a clockwise direction, when the roll is viewed from the left, with the handlebar oriented toward the front.

According to one embodiment, the folding of the inflatable cushion may comprise folding of the roll of the inflatable cushion so as to have a U shape, the arms of the U being able to be arranged substantially parallel to a steering column of the scooter, and the arms of the U preferably being able to have edges folded back on themselves, preferably with the arms of the U oriented upward. Such a U-shaped folding makes it possible to obtain quick upward deployment, that is deployment above the handlebar.

According to one embodiment, the folding of the inflatable cushion may comprise an accordion-style fold arranged at an end of the inflatable cushion attached to the scooter. Such an accordion-style fold makes it possible to limit the forces on the inflatable cushion at the start of deployment, and to enable rapid displacement out of the housing which typically surrounds the inflatable cushion before deployment.

According to one embodiment, the scooter may comprise a bearing surface for the inflatable cushion inclined relative to the vertical, so as to cause deployment of the inflatable cushion toward the front of the scooter and from, or toward, the side of the handlebar which is opposite to the platform and/or to the wheels. Such a bearing surface ensures the final orientation of the inflatable cushion upward and toward the front of the scooter.

According to one embodiment, when the two wheels of the scooter are resting on a reference plane, the bearing surface may be inclined relative to a normal of the reference plane by an angle within a range extending from 5° to 85°, preferably from 25° to 65°, in a trigonometric sense, when the scooter is viewed form the left.

According to one embodiment, the inflatable cushion may comprise seams and/or straps and/or strips of fabric arranged to ensure, after or during deployment, a thickness less than a width and/or a length of the deployed inflatable cushion, and/or a thickness of less than 15 cm and preferably less than 10 cm.

According to one embodiment, the inflatable cushion, after deployment, may have a volume of between 30 l and 50 l and advantageously between 35 l and 45 l.

According to one embodiment, the inflatable cushion may have, after or during deployment, a width greater than or equal to 80% of a size of the handlebar, at least at the handlebar. Thus, the user's hands are also protected by the inflatable cushion.

According to one embodiment, the inflatable cushion may have, after or during deployment, a length greater than or equal to 60 cm. Typically, the inflatable cushion has an end portion which can be inserted between the obstacle and the user's head.

According to one embodiment, after or during deployment, the inflatable cushion seen from the front, may have:
- a first portion arranged at the steering column with a first width,
- a second portion arranged at the handlebar with a second width,
- a third portion arranged above the handlebar, or on the side of the handlebar opposite the platform, with a third width,
- preferably a fourth rounded portion forming the end of the inflatable cushion, and:
the first width may be less than the second width, and/or the second width may be less than the third width.

The first, narrow, portion is arranged below the handlebar after deployment: this limits the volume to be inflated in this area where there is no need to protect the user, and this makes it possible not to interfere with the housing wherein the inflatable cushion is folded.

According to one embodiment, the safety device may comprise a gas generator, preferably with an electro-pyrotechnic initiator.

According to one embodiment, the gas generator may be arranged on or in a steering column. This limits the overall bulk of the safety device.

According to one embodiment, the gas generator may be arranged on or in the handlebar. This makes it possible to limit the dimensions of the inflatable cushion.

According to one embodiment, the inflatable cushion may be attached to the handlebar. This makes it possible to limit the dimensions of the inflatable cushion.

According to one embodiment, the gas generator may have an elongated shape with a gas diffuser at one end, and the gas generator may be mounted in the steering column with the gas diffuser on the steering wheel side. This makes it possible to limit the dimensions of the safety device, with the diffuser of the gas generator as close as possible to the inflatable cushion.

According to one embodiment, the safety device may form a safety module, comprising at least one intermediate tube forming a part of the steering column. Thus, the safety device is easy to install while limiting the overall bulk: a part of the steering column forms part of the safety device, which provides good integration, in particular mechanical.

According to one embodiment, the gas generator may be arranged in the intermediate tube. This limits the external bulk and provides good compactness.

According to one embodiment, the inflatable cushion, after or during deployment, may have a frontward and upward deployed direction when the scooter is resting on horizontal ground.

According to one embodiment, the deployed direction may be inclined toward the front relative to a vertical by an angle of between 45° and 5°, and preferably between 30° and 10°.

According to one embodiment, the scooter may comprise steering stops limiting an angle of rotation of the handlebar to ±90°, and preferably to +70°, relative to a longitudinal direction of the elongated platform. This makes it possible to ensure that the inflatable cushion is not deployed toward the rear of the scooter, which improves the user's safety.

According to one embodiment, the scooter may comprise an inhibition unit such as a speed sensor and/or contactors, arranged to prevent deployment of the inflatable cushion if a speed of the scooter is less than 10 km/h, and/or if the handlebar is pivoted beyond an angle of rotation of the handlebar at ±90°, and preferably at ±70°, relative to a longitudinal direction of the elongated platform. Such an implementation makes it possible to avoid inopportune deployments (at low speed and/or in scenarios in which the handlebar is oriented toward the user.

DESCRIPTION OF THE FIGURES

Other features and advantages of the present invention will be seen more clearly from the following detailed description of an embodiment of the invention provided by way of a non-limiting example and illustrated by the appended drawings, wherein:

FIG. 1 depicts a side view of a scooter equipped with a safety device with an inflatable cushion;

FIG. 2 depicts the scooter from FIG. 1 with the inflatable cushion deployed;

FIG. 3 depicts a front view of the scooter from FIG. 1;

FIG. 4 depicts a front view of the scooter from FIG. 2;

FIG. 5 depicts a detail of the safety device from FIG. 1.

DETAILED DESCRIPTION OF EMBODIMENT(S)

FIG. 1 depicts a scooter comprising, in particular, a front wheel 130, a rear wheel 135, an elongated platform 140, a handlebar 110 connected to the front wheel 130 by a steering column 120.

A safety device is also provided on the scooter, and comprises in particular:
- a housing 10 which contains an inflatable cushion 20,
- a bearing plate providing a bearing surface 40,
- a tube 50 forming a part of the steering column 120,
- a gas generator 30 provided in the tube 50,
- an electronic control unit, being able for example to be located in the housing 10,
- an acceleration measuring unit 60 attached in this case at the mudguard of the front wheel 130, but being able to be included in the electronic control unit.

In FIG. 1, before deployment, the inflatable cushion 20 is stowed/hidden/shaped/folded in the housing 10 and connected to the gas generator 30 to be able to be inflated when required. To this end, a gas conduit (not shown) may be provided between the gas generator 30 and the inflatable cushion 20.

Moreover, it is possible to advantageously provide for using a gas generator 30 of tubular shape, to insert it into the tube 50, in order to supply good compactness. It is also possible to provide in particular a gas generator 30 which has a diffusion area at a single end, and to provide this end at the area of coupling of the inflatable cushion 20, as depicted.

The gas generator 30 may be of entirely pyrotechnic type, or of the pressurized gas (cold gas) type, or may use pyrotechnical material and pressurized gases (hybrid generator) to inflate the inflatable cushion. A tubular gas generator may be provided, with a diameter of less than 45 mm, preferably less than 35 mm, and even more preferentially less than 30 mm. The length of the gas generator may be less than 500 mm, and preferably less than 350 mm. Interchangeable gas cartridges may be provided, to "recharge" the gas generator 30.

The housing assembly 10, inflatable cushion 20, bearing plate, tube 50, gas generator 30, may be provided to form a module to be directly integrated on the scooter, at attachments 51 and 52.

The gas generator 30 typically comprises an electro-pyrotechnic initiator and may be ignited by an electric current. To this end, the electronic control unit may generate this ignition current.

An acceleration measuring unit 60 is provided at the front fender, but may also be provided in the electronic control unit or at another location on the scooter, in order to detect sudden deceleration which corresponds to an impact with an obstacle. In case of sudden deceleration, the acceleration measuring unit 60 of the electronic control unit generates a particular signal and sends it to the electronic control unit which in turn generates the ignition signal.

The scooter depicted may be an electric scooter with an on-board battery (housed in the platform 140 and/or the steering column 120 and/or in the handlebar 110) to power the electric drive motor, and it is advantageously possible for the electronic control unit to be powered by this battery.

FIG. 2 depicts a user on the scooter, and an obstacle 200 (in this case a motor vehicle) hit by the front wheel 130. Consequently, strong deceleration is detected and the electronic control unit has generated an ignition signal which has triggered the gas generator 30.

Consequently, the inflatable cushion 20 has been deployed so as to be positioned between the user and the obstacle 200. In detail, the inflatable cushion 20 has been deployed upwardly, on the side of the handlebar 110 opposite the platform 140, leaving the housing 10 (one cover of which has opened by breaking or unclipping, for example).

Once deployed, the inflatable cushion, in side view as in FIG. 2, has an inclined toward the front direction forming an angle β with a vertical of between 450 and 5°, and preferably between 30° and 10°. The bearing surface 40 makes it possible to facilitate this inclination, and the bearing surface 40 forming an angle α with a vertical within a range extending from 5° to 85°, preferably from 25° to 65°. It will be noted that the vertical mentioned here is a normal to the ground on which the wheels are resting.

In order to supply rapid and reproducible deployment, it is proposed to shape or fold the inflatable cushion 20 in a particular way, as depicted in FIGS. 3 and 5. Firstly, FIG. 5 shows a detail from FIG. 1, and in particular a diagram of the folding of the inflatable cushion 20. Firstly, an accordion-style fold 22 is provided at the bearing surface 40, which provides rapid egress from the housing 10. Moreover, rolling 22 of the inflatable cushion 20 in on itself is provided, in order to enable reliable deployment, in particular if part of the obstacle 200 is present in the trajectory: with rolling 22 in the clockwise direction (viewed from the left, with the handlebar facing the front), then the inflatable cushion unrolls while bearing against the obstacle 200.

Moreover, FIG. 3 depicts a front view of the scooter from FIG. 1, to show in particular the folding of the inflatable cushion 20. Indeed, in this view, it is noted that the inflatable cushion 20 before deployment is folded to have a U shape, with the arms of the U being folded on themselves. Such folding is compact and also provides rapid deployment toward the top of FIG. 3.

In FIG. 2, it is noted that the deployed inflatable cushion 20 is arranged between the obstacle 200 and the user, and FIG. 4 shows the geometry of the inflatable cushion from the front. At the housing 10, the inflatable cushion 20 has a small width, so as not to interfere with the housing 10. At the handlebar 110, the inflatable cushion 20 has virtually the same width as the handlebar 110, such that the user's hands are also protected. Finally, at the upper part, the latter has a rounded shape or an inverted V shape, in order to best protect the user's head.

It will be understood that various modifications and/or improvements obvious to those skilled in the art can be made to the different embodiments of the invention described in the present description, without going beyond the scope of the invention as defined by the appended claims.

In particular, it is possible to provide, as addition or alternative:
- the fixing of the gas generator 30 at the handlebar, and/or
- the fixing of the housing 10 at the handlebar, and/or
- the fixing of the inflatable cushion 20 at the handlebar, and/or
- a support tightly attached to the handlebar to accommodate a mobile telephone, and/or
- inhibiting the ignition according to several scenarios (speed too low, handlebar pivoted rearward, user's feet not present on the platform at the time of, or before (for example 1 second) the detection of deceleration, etc.), and/or
- a mechanism to be actuated by the user to deactivate operation (if the user is anticipating sport use, for example), with informational feedback on this deactivated state.

The invention claimed is:

1. An electric scooter for a user, comprising:
   two wheels,
   an elongated platform mounted on the two wheels and arranged to receive at least one foot of the user,
   a steering handlebar articulated relative to the platform and connected to one of the two wheels, and
   a safety device with an inflatable cushion arranged to be deployed in case of sudden deceleration of the scooter, the inflatable cushion having, after or during a deployment, a width greater than or equal to 80% of a size of the handlebar, at least at the handlebar, and having a frontward and upward deployed direction inclined toward the front of the handlebar relative to a vertical by an angle of between 45° and 5° when the scooter is resting on horizontal ground,
   wherein the inflatable cushion is deployed to overlap the front of the handlebar and configured to protect the user standing on the elongated platform of the electric scooter,
   wherein, in an undeployed condition, the inflatable cushion is in a rolled configuration in a clockwise direction, when viewed from a left side, with the handlebar oriented toward the front, thereby deploying in the frontward direction relative to the scooter during the deployment, and
   wherein the rolled inflatable cushion is folded with a U-shape, when viewed from the front, and arms of the U-shaped inflatable cushion are arranged substantially parallel to a steering column of the scooter and have edges folded back on themselves with the arms oriented upward.

2. The scooter according to claim 1, wherein the safety device, before the deployment, forms a safety module comprising a housing containing the inflatable cushion and arranged on the handlebar, or between the handlebar and:
   a front wheel, or
   the platform.

3. The scooter according to claim 1, wherein the inflatable cushion is arranged to be deployed at least on a side of the handlebar opposite to the platform or to the two wheels.

4. The scooter according to claim 1, comprising an electronic control unit, arranged to control the deployment of the inflatable cushion.

5. The scooter according to claim 1, wherein the rolled inflatable cushion comprises an accordion-style fold arranged at an end of the inflatable cushion configured to be attached to the scooter.

6. The scooter according to claim 1, comprising a bearing surface for the inflatable cushion inclined relative to the vertical, so as to cause a deployment of the inflatable cushion toward the front of the scooter and from or toward the side of the handlebar which is opposite the platform or to the wheels.

7. The scooter according to claim 1, wherein the safety device comprises a gas generator, having an electro-pyrotechnic initiator.

8. The scooter according to claim 7, wherein the gas generator has an elongated shape with a gas diffuser at one end, and wherein the gas generator is mounted in a steering column with the gas diffuser on a steering wheel side which is opposite the platform and to the wheels.

9. The scooter according to claim 1, wherein the inflatable cushion has, after or during the deployment, a frontward and upward deployed direction when the scooter is resting on horizontal ground.

10. The scooter according to claim 1, wherein, after or during the deployment, the inflatable cushion is configured to protect hands of the user by overlapping the front of the handlebar.

11. An electric scooter, for a user comprising:
    two wheels,
    an elongated platform mounted on the two wheels and arranged to receive at least one foot of the user,
    a steering handlebar articulated relative to the platform and connected to one of the two wheels,
    a safety device with an inflatable cushion arranged to be deployed in case of sudden deceleration of the scooter, and
    an inhibition unit having a speed sensor or contactors, arranged to prevent deployment of the inflatable cushion if a speed of the scooter is less than 10 km/h, or if the handlebar is pivoted beyond an angle of rotation of the handlebar at 90°, or at ±70°, relative to a longitudinal direction of the elongated platform.

* * * * *